United States Patent
Maccioni et al.

(10) Patent No.: US 11,762,402 B2
(45) Date of Patent: Sep. 19, 2023

(54) ELECTRO-THERMAL BASED DEVICE AND METHOD FOR OPERATING A HEATER

(71) Applicant: Sciosense B.V., AE Eindhoven (NL)

(72) Inventors: Alberto Maccioni, La Spezia (IT); Monica Schipani, Pisa (IT); Giuseppe Pasetti, Pisa (IT); Syed Zeeshan Ali, Cambridge (GB); Clinton Sean Dixon, Cambridge (GB)

(73) Assignee: Sciosense B.V., AE Eindhoven (NL)

( * ) Notice: Subject to any disclaimer, the term of this patent is extended or adjusted under 35 U.S.C. 154(b) by 0 days.

(21) Appl. No.: 17/287,865

(22) PCT Filed: Oct. 25, 2019

(86) PCT No.: PCT/EP2019/079228
§ 371 (c)(1),
(2) Date: Apr. 22, 2021

(87) PCT Pub. No.: WO2020/089096
PCT Pub. Date: May 7, 2020

(65) Prior Publication Data
US 2021/0389786 A1    Dec. 16, 2021

(30) Foreign Application Priority Data
Oct. 30, 2018    (EP) ..................................... 18203423

(51) Int. Cl.
*G05D 23/19*    (2006.01)
*G05D 23/24*    (2006.01)
(Continued)

(52) U.S. Cl.
CPC ........... *G05D 23/1917* (2013.01); *G05B 6/02* (2013.01); *G05D 23/2401* (2013.01); *G01N 25/18* (2013.01); *G01N 27/123* (2013.01)

(58) Field of Classification Search
CPC ........... G05D 23/1917; G05D 23/2401; G05D 23/1919; G05B 6/02; G01N 25/18;
(Continued)

(56) References Cited

U.S. PATENT DOCUMENTS 5,214,267 A * 5/1993 Hoshi ................. F02D 41/1494
219/494
5,226,472 A * 7/1993 Benevelli ........... G05D 23/1919
165/263

(Continued)

FOREIGN PATENT DOCUMENTS

DE    102010003966 B3    5/2011
EP    2762867 A1    8/2014
(Continued)

OTHER PUBLICATIONS

AMS AG, "AS-MLV-P2—Air Quality Sensor," datasheet, Oct. 12, 2015, 24 pages.
(Continued)

*Primary Examiner* — Kenneth M Lo
*Assistant Examiner* — Tameem D Siddiquee
(74) *Attorney, Agent, or Firm* — Slater Matsil, LLP

(57) ABSTRACT
In an embodiment an electro-thermal device includes a heater, a readout circuit, a digital controller having a first input coupled to a first output of the readout circuit and a digital sigma-delta modulator having a first input coupled to an output of the digital controller and an output coupled to the heater.

11 Claims, 10 Drawing Sheets

(51) Int. Cl.
  *G05B 6/02*   (2006.01)
  *G01N 25/18*  (2006.01)
  *G01N 27/12*  (2006.01)

(58) Field of Classification Search
  CPC ............ G01N 27/123; G01N 21/1702; G01N 21/3504; G01N 27/12; G01N 27/14; G01N 2021/1704; G01N 2291/021; G01N 29/2418; G01N 29/2431
  See application file for complete search history.

(56) References Cited

U.S. PATENT DOCUMENTS

| | | | |
|---|---|---|---|
| 6,578,563 B2 | 6/2003 | Hada et al. | |
| 6,720,534 B2* | 4/2004 | Hada .................. | G01N 27/4067 |
| | | | 219/494 |
| 6,795,752 B1 | 9/2004 | Zhao et al. | |
| 8,552,380 B1* | 10/2013 | Florin ....................... | G01J 5/12 |
| | | | 250/338.4 |
| 8,859,303 B2 | 10/2014 | Udrea et al. | |
| 9,567,209 B1 | 2/2017 | Cheng et al. | |
| 2005/0029250 A1* | 2/2005 | Niwa .................. | F02D 41/1494 |
| | | | 219/494 |
| 2008/0273573 A1* | 11/2008 | Gerder ..................... | G01K 1/16 |
| | | | 374/E7.042 |
| 2009/0145226 A1* | 6/2009 | Cai ....................... | G01P 15/008 |
| | | | 219/490 |
| 2012/0103065 A1* | 5/2012 | Muehleisen .......... | G01J 3/4338 |
| | | | 73/24.02 |
| 2014/0117955 A1* | 5/2014 | Zoso ..................... | H02M 3/157 |
| | | | 323/271 |
| 2015/0109157 A1* | 4/2015 | Caldwell ............... | H03M 3/458 |
| | | | 341/143 |
| 2016/0305835 A1* | 10/2016 | Kollias .................. | G01L 9/12 |
| 2016/0305898 A1 | 10/2016 | Georgi et al. | |
| 2016/0349201 A1* | 12/2016 | Graunke ................ | G01N 27/123 |
| 2017/0074815 A1 | 3/2017 | Udrea et al. | |
| 2017/0328702 A1* | 11/2017 | Vossough .............. | G01P 15/093 |
| 2017/0343419 A1 | 11/2017 | Hopper et al. | |
| 2017/0343502 A1 | 11/2017 | Ali et al. | |
| 2018/0202958 A1 | 7/2018 | Ali et al. | |

FOREIGN PATENT DOCUMENTS

| | | |
|---|---|---|
| EP | 2995939 A1 | 3/2016 |
| JP | H11344466 A | 12/1999 |
| JP | 2008035038 A | 2/2008 |

OTHER PUBLICATIONS

AMS AG, "CCS811—Ultra-Low Power Digital Gas Sensor for Monitoring Indoor Air Quality," datasheet, May 1, 2018, 34 pages.

U. Dibbern et al., "A Substrate For Thin-Film Gas Sensors In Microelectronic Technology," Sensors and Actuators B, 2, Aug. 31, 1989, 8 pages.

Lombardi, A et al., "A CMOS integrated interface circuit for metal-oxide gas sensors," Sensors and Actuators B Chemical, vol. 142, Issue 1, Elsevier B.V., Oct. 12, 2009, 8 pages.

* cited by examiner

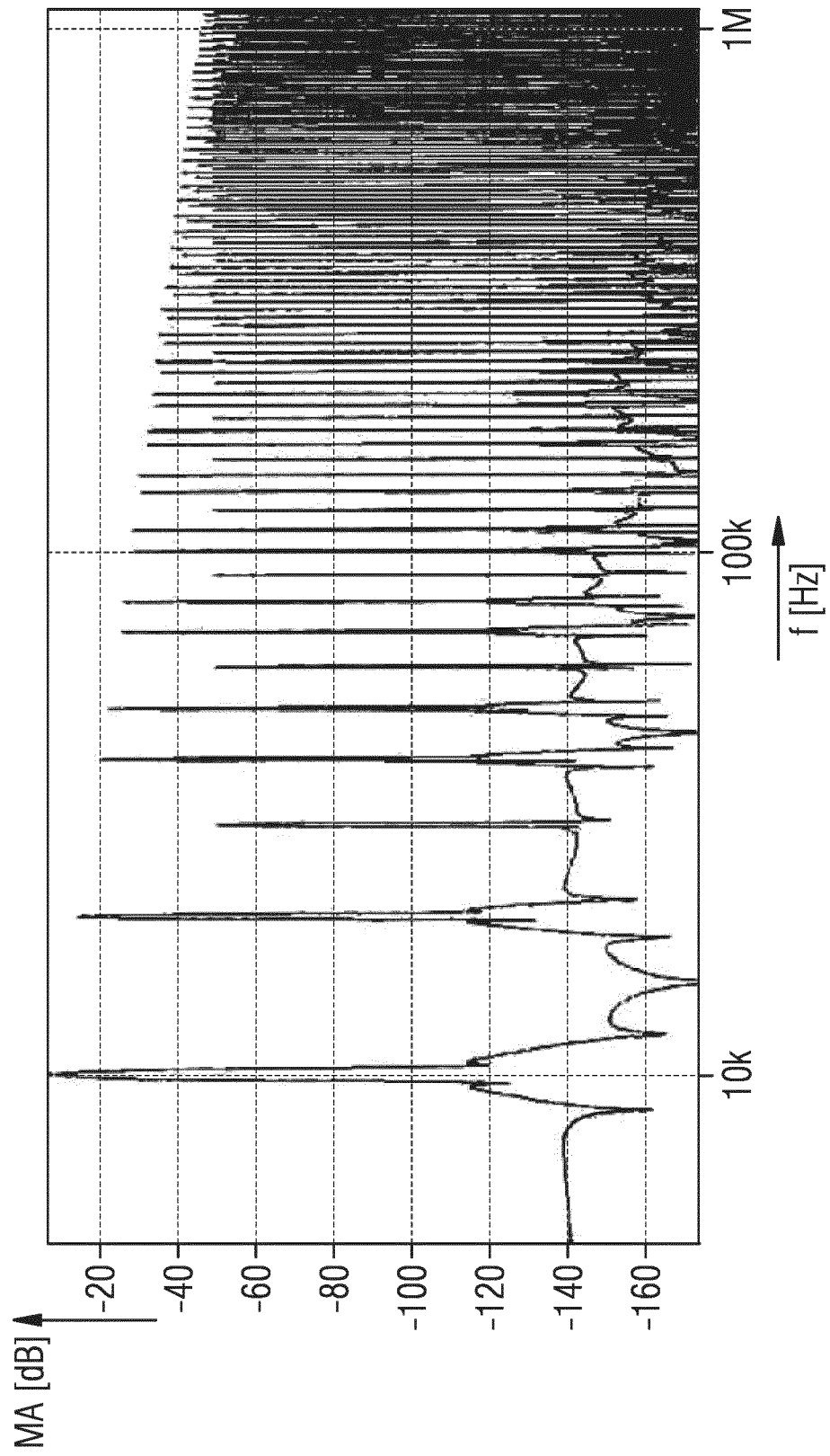

ELECTRO-THERMAL BASED DEVICE AND METHOD FOR OPERATING A HEATER

This patent application is a national phase filing under section 371 of PCT/EP2019/079228, filed Oct. 25, 2019, which claims the priority of European patent application 18203423.1, filed Oct. 30, 2018, each of which is incorporated herein by reference in its entirety.

TECHNICAL FIELD

The present disclosure is related to an electro-thermal based device, an apparatus comprising the electro-thermal based device and a method for operating a heater in an electro-thermal based device.

BACKGROUND

An electro-thermal based device, abbreviated as device, typically comprises a heater and a control circuit controlling a current flowing through the heater. The device is often realized as a micro-electro-mechanical system device, abbreviated as MEMS device. The heater may be used for heating of a gas-sensing material, for emitting infrared radiation or for another purpose.

SUMMARY

Embodiments provide an electro-thermal based device, an apparatus comprising the electro-thermal based device and a method for operating a heater in an electro-thermal based device that improves the control of a heater.

In an embodiment, an electro-thermal based device comprises a heater, a readout circuit, a digital controller having a first input coupled to a first output of the readout circuit, and a digital sigma-delta modulator having a first input coupled to an output of the digital controller and an output coupled to the heater.

Advantageously, the heater is driven by pulses of the digital sigma-delta modulator and, thus, receives the exact amount of electrical power to keep a temperature of the heater constant.

In an embodiment, the electro-thermal based device is realized as a gas sensor or an array of gas sensors. Chemical processes such as absorption, adsorption or a chemical reaction depend on the temperature of the reactants. Thus, a precise control of temperature of the gas sensor or gas sensors is useful for precise measurement. The gas or gases to be detected may be oxidizing gases, reducing gases, combustible gases, humidity or other gases. For example, the electro-thermal based device may detect ethanol, toluene, nitrogen dioxide, ozone, methane, hydrogen, carbon monoxide, or may be sensitive to a number of volatile organic compounds (abbreviated VOCs).

In an embodiment, the electro-thermal based device is realized as a resistive gas sensor or a calorimetric gas sensor. The electro-thermal based device may comprise a sensing material thermally coupled to the heater. The sensing material interacts with the gas to be detected. Advantageously, the use of an appropriate sensing material results in a high sensitivity and a high selectivity of the gas measurement.

In an embodiment, the electro-thermal based device is a thermal conductivity sensor. The thermal conductivity sensor is designed to measure a thermal conductivity of a sample. Advantageously, since different gases have a different thermal conductivity, the concentration of a gas in the sample can be detected. For example, in case of a binary mixture of two gases, the thermal conductivity sensor is able to determine the ratio of the two gases. The ratio of two gases may be determined e.g. in an apparatus of the process industry. The thermal conductivity sensor may be free of a sensing material. Advantageously, aging or drift phenomena that may be caused by a sensing material can be avoided.

In an embodiment, the electro-thermal based device is implemented as an infrared emitter, abbreviated IR emitter. The heater is configured as infrared radiation emitter. Advantageously, the electro-thermal based device emits infrared radiation without using a compound semiconductor such as an III-V compound semiconductor. Advantageously, the electro-thermal based device may comprise a silicon substrate and can be fabricated by silicon processes. Infrared is abbreviated IR.

In an embodiment, the electro-thermal based device is realized as an optical gas sensor or a photoacoustic gas sensor. The heater is implemented as an IR radiation emitter. The electro-thermal based device comprises a sensor element or a detector.

In a further development, in case the electro-thermal based device being an optical gas sensor, the detector may be an optical detector such as an IR detector. The heater is coupled to the optical detector by an optical path. A gas in the optical path that absorbs IR radiation can be detected by measurement of the IR radiation detected by the optical detector. The optical gas sensor detects the gas by detecting the absorption of an infrared wavelength that is characteristic for the gas. By optically filtering the IR radiation emitted by the heater, the IR radiation spectrum is limited to the absorption band of the gas to be detected.

In a further development, in case the electro-thermal based device being a photoacoustic gas sensor, the sensor element may be a microphone or pressure sensor. A sample container or chamber encloses a gas sample, the heater being used as IR emitter and the microphone or pressure sensor. A gas in the gas sample that absorbs IR radiation is heated and, thus, can be detected by the microphone or pressure sensor. Typically, the IR radiation emitted by the heater is modulated or chopped with a frequency that can be detected by the microphone or pressure sensor. The device comprises a filter for selecting a suitable wavelength of the IR radiation. An apparatus may comprise a pump and at least a valve coupled to the sample container or chamber for changing the gas sample.

In an embodiment, the electro-thermal based device is a micro-electro-mechanical-system device, abbreviated MEMS device. The MEMS device comprises a membrane such as e.g. a dielectric membrane. Typically a dielectric layer or dielectric layers are supported on a semiconductor substrate. The substrate has an etched portion and part of the dielectric that is adjacent to the etched portion of the substrate is considered as the dielectric membrane. The heater may be embedded in the membrane or may be above or below the membrane. Advantageously, thermal conduction and thus power consumption is kept low by arranging the heater in or on the membrane.

In an embodiment, the readout circuit generates a readout signal at the first output of the readout circuit. The readout signal is a function of the resistance of the heater. Advantageously, the readout signal depends on a temperature of the heater and can be used for temperature measurement.

In an embodiment, the digital controller comprises a second input for receiving a target signal. The digital controller generates a control signal as a function of the readout signal and of the target signal and provides the control signal to the first input of the digital sigma-delta modulator. Advantageously, the resistance value of the heater can be set by the target signal. The target signal may be constant or may be different in different phases of operation of the device. The target signal may be a digital signal.

In an embodiment, the digital sigma-delta modulator generates a modulator output signal. Advantageously, the modulator output signal has frequency spectrum with low amplitude values in the audible frequency range. A current flowing through the heater or a voltage provided to the heater may be identical with the modulator output signal or may be set as a function of the modulator output signal.

In an embodiment, the digital sigma-delta modulator comprises a second input for receiving a pause signal. The digital sigma-delta modulator generates the modulator output signal with a constant value (e.g. the value zero) when the pause signal has a first value. The digital sigma-delta modulator generates the modulator output signal with a value being a function of the control signal provided to the digital sigma-delta modulator, when the pause signal has a second value. Advantageously, the resistance value of the heater can be measured with high accuracy, when the pause signal has the first value.

In an embodiment, the digital sigma-delta modulator comprises a sigma-delta modulator circuit and a power buffer. An input of the sigma-delta modulator circuit is connected to the first input of the digital sigma-delta modulator. The power buffer comprises an input connected to an output of the sigma-delta modulator circuit and an output connected to the output of the digital sigma-delta modulator for providing the modulator output signal. The power buffer comprises a control input connected to the second input of the digital sigma-delta modulator. Advantageously, the logical function and the supply function of the digital sigma-delta modulator are separated in two circuit parts. Advantageously, the sigma-delta modulator circuit generates internal signals and a circuit signal having the standard value of a logic circuit and the power buffer generates the modulator output signal with a value that is appropriate for providing to the heater.

In an embodiment, the readout circuit comprises a second output coupled to the second input of the digital sigma-delta modulator. The readout circuit generates the pause signal. The readout circuit determines a readout signal when the pause signal has the first value. Advantageously, an interference between the readout circuit and the digital sigma-delta modulator is avoided.

In an embodiment, the heater is electrically coupled to the readout circuit. The readout circuit generates the readout signal as a function of the resistance value of the heater. Advantageously, the device is free of a temperature sensor.

In an embodiment, the digital controller is realized as a proportional-integral-derivative, PID, digital controller or a proportional-integral, PI, digital controller. Advantageously, the resistance value of the heater is quickly adjusted to a predetermined value by choosing appropriate parameters of the PID or PI digital controller.

In an embodiment, an apparatus comprises the electro-thermal based device. The apparatus is realized as one of a group comprising a mobile device, an indoor air monitor, an outdoor air monitor, an automotive air monitor and an industrial air or gas monitor.

In an embodiment, a method for operating a heater in an electro-thermal based device comprises:
  providing a modulator output signal in response to a control signal by a digital sigma-delta modulation or a signal derived from the modulator output signal to a heater,
  generating a readout signal by a readout circuit, and
  generating the control signal as a function of the readout signal.

In an embodiment, the readout signal is generated as a function of a resistance value of the heater. Thus, the heater is used for heating and for temperature measurement.

In an embodiment, the modulator output signal is implemented as a digital signal, e.g. a pulsed signal or bitstream signal. In an embodiment, the readout signal and the control signal are implemented as digital signals. The use of digital signals allows the realization by low-power digital circuits.

The method of operating a heater in an electro-thermal based device may be implemented, for example, by the electro-thermal based device according to one of the embodiments defined above. The method of operating a heater in an electro-thermal based device may e.g. be realized as a method for gas measurement and/or a method for emitting IR radiation.

In an embodiment, the electro-thermal based device realizes a closed loop heater control for gas sensing applications.

In an embodiment, a module comprises the heater. The module can be realized as a gas sensor module or/and off-chip module.

In an embodiment, the sensitivity of the gas sensor module comprising the heater is directly related to the temperature of the gas sensor module, so it is advantageous to keep the temperature constant. The electro-thermal based device keeps the power consumption low, so the drive method used does not have high power losses. Depending on the sensor used, a certain temperature profile may be applied to the sensor; therefore, a fast response time is an advantage. The closed loop architecture of the electro-thermal based device is suited for this purpose. The gas sensor module senses a gas or gases using resistive gas sensors.

In an embodiment, a feedback control for a heater comprises a sigma-delta drive for the heater, a resistance readout circuit and a digital controller configured such that the overall power provided by the sigma-delta drive is set by a set point value provided externally and the measured heater resistance. The heater bias is turned off to measure the heater resistance.

In an embodiment, the feedback control system is realized such that the heater is part of a gas sensor.

In an embodiment, the feedback control system is realized such that the heater is an IR emitter.

Advantageously, a sigma-delta drive method is used to drive the heater. Moreover, the temperature feedback is provided by the use of the heater itself; this results in lower thermal power losses, and also fewer bond pads on the device.

The electro-thermal based device performs a loop processing: Fully digital processing is used with a PID algorithm. A digital sigma-delta modulator driven by a digital word is used as a power driver. Advantageously, the gas sensor employs a sigma-delta drive method. The control loop for the heater uses the sigma-delta drive method and uses the heater itself as the temperature sensor.

The thermal sensor type and concept is advantageous, since the resistance of the heater is sensed by applying a current and reading the voltage. The heater is used as a temperature sensor. The resistance of the heater is correlated with the temperature of the heater via characterization. Thus, the device may be free of a dedicated temperature sensor, which could be a thermocouple, a resistance temperature detector (shorted RTD) or another sensor. Therefore, sensor module complexity is reduced.

The power consumption is low and the flexibility is high, because the device uses a fully digital processing; the analog readout circuitry can stay powered off for most of the time; it has to operate only at fixed intervals when the PID controller calculates a new power level. The power efficiency and the temperature stability are high: The pulsed output driven by a sigma-delta driver results in low power losses, and the heating power can be varied with a high resolution. The temperature ripple is much lower than with e.g. a pulse-width-modulated driver, shorted PWM driver. The emission level is advantageous: the sigma-delta driver spreads emissions over a broad spectrum compared to a PWM driver which concentrates them in lines multiples of the PWM frequency.

In an embodiment, a circuit or device comprises a gas sensor module comprising a heater and a resistive sensing material; a resistance readout circuit; a digital PID controller; a digital sigma-delta modulator; and a clock generator.

In an embodiment, the device is configured such that a temperature of the heater is between 50° C. and 600° C., alternatively between 100° C. and 550° C., alternatively between 200° C. and 500° C. or alternatively between 300° C. and 400° C.

The relation between heater resistance and heater temperature is known, therefore it is possible to specify the target temperature in terms of a resistance value. The PID controller compares the target resistance value with the actual heater resistance acquired by the resistance meter; it then generates a desired power level taking into account the present error and the error history. The sigma-delta modulator transforms the multi-bit power level into a high frequency bitstream; the power level information is coded as pulse density in the bitstream. The sigma-delta modulator is coupled to a clock which may be unrelated to a system clock. The bitstream is directly applied to the heater; the value of the power applied to the heater is then either zero or maximum (VDD2/RHeater) according to the bit value; the heating efficiency is very high, since the only loss is through the ON-resistance of the power driver (i.e. very low). RHeater is the resistance value of the heater and VDD is the value of a supply voltage.

Following a system clock pulse, a pause signal is generated so that the power to the heater is suspended for the time necessary to acquire the heater resistance. In order to sense the heater resistance a DC method is employed: The resistance of the heater is measured by applying a known current and acquiring the resulting voltage or by applying a known voltage and acquiring the resulting current. The loop is then closed on the input of the PID controller. After the thermal loop reaches equilibrium, it is possible to measure the gas sensor itself; the value of the sensor resistance is a function of temperature and gas concentration.

In order to enhance gas selectivity and increase sensor precision, optional a certain temperature profile in time is applied by changing the target given to the PID controller, while performing a number of sensor readings at specific points of the temperature profile.

Variations or alternatives over the described design or operation may be: Multiple sensors and heaters are arranged in the same module (e.g. a gas sensor module), each having its own temperature control loop. The heater resistance is measured while the heater is powered, i.e. without the need to turn-off the power driver. The module is directly built on the integrated circuit, using a membrane grown above the silicon but separated by an air gap. The module (including the heater and sensing material) is fabricated on the same chip as the integrated circuit. The heater can be a resistive heater or a metal-oxide-semiconductor field-effect transistor, abbreviated MOSFET. The control loop can be external to the sensor package.

The electro-thermal based device allows a flexible, precise and efficient temperature control of the module.

BRIEF DESCRIPTION OF THE DRAWINGS

The following description of figures of embodiments may further illustrate and explain aspects of the electro-thermal based device, the apparatus comprising the electro-thermal based device and the method for operating a heater in an electro-thermal based device. Devices and circuit parts with the same structure and the same effect, respectively, appear with equivalent reference symbols. In so far as devices or circuit parts correspond to one another in terms of their function in different figures, the description thereof is not repeated for each of the following figures.

FIGS. 4A and 4B show examples of characteristics of a further electro-thermal based device;

DETAILED DESCRIPTION OF ILLUSTRATIVE EMBODIMENTS

Figure 1A:
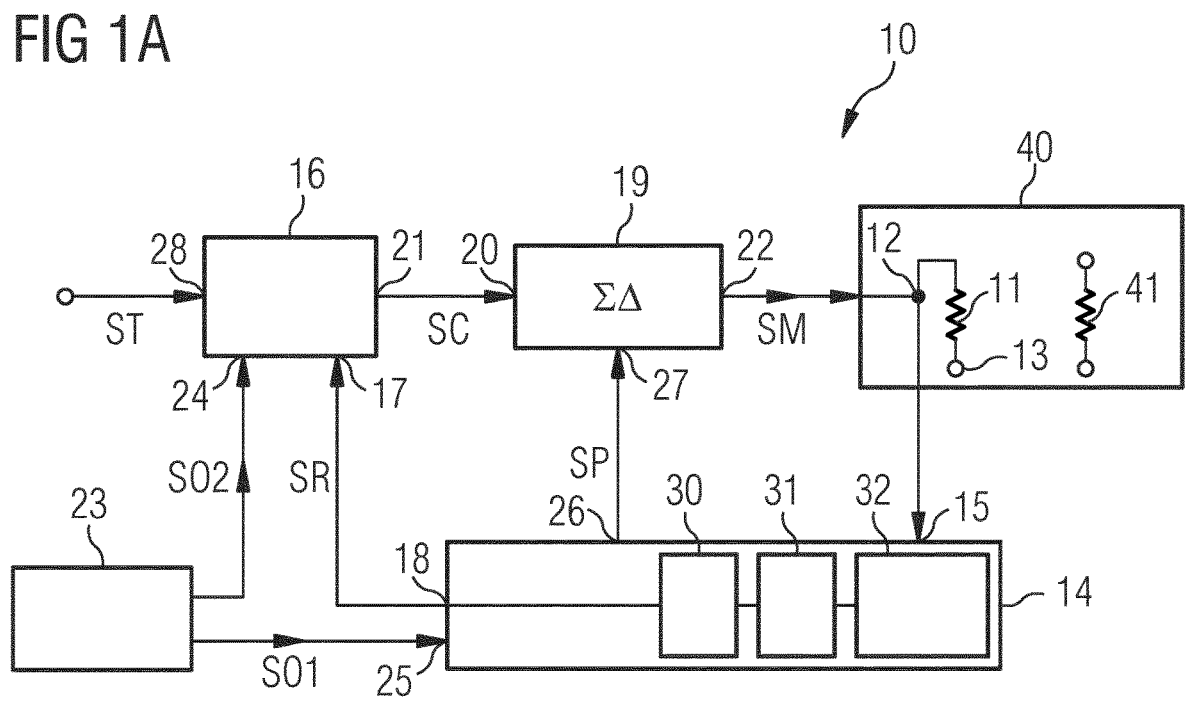
FIGS. 1A and 1B show examples of an electro-thermal based device.

FIG. 1A shows an example of an electro-thermal based device 10, abbreviated as device. The device 10 comprises a heater 11. The heater 11 is realized as a resistive heater. The heater 11 has a first and a second terminal 12, 13. A material of the heater 11 may be a metal—such as platinum, gold, nickel, copper, molybdenum, aluminum, tungsten or titanium—, a mixture of metals, a semiconductor—such as polysilicon or monocrystalline silicon—or a silicide.

Moreover, the device 10 comprises a readout circuit 14. The readout circuit 14 is coupled to the heater 11. For example, the readout circuit 14 has an input 15 connected to the first terminal 12 of the heater 11. The input 15 of the readout circuit 14 may be directly and permanently connected to the first terminal 12 of the heater 11. Additionally, the device 10 comprises a digital controller 16. The digital controller 16 comprises a first input 17 coupled to a first output 18 of the readout circuit 14. The first input 17 of the digital controller 16 is a digital input. The first output 18 of the readout circuit 14 is a digital output. The first input 17 of the digital controller 16 may be directly and permanently connected to the first output 18 of the readout circuit 14. The digital controller 16 has a second input 28. The second input 28 of the digital controller 16 is a digital input. The digital controller 16 is realized as a proportional-integral-differential digital controller, shorted as PID controller. Alternatively, the digital controller 16 is realized as a proportional-integral digital controller, shorted as PI controller.

Additionally, the device 10 comprises a digital sigma-delta modulator 19, abbreviated as modulator. A first input 20 of the modulator 19 is coupled to an output 21 of the digital controller 16. The first input 20 of the modulator 19 is a digital input. The output 21 of the digital controller 16 is a digital output. The first input 20 of the modulator 19 may be directly and permanently connected to the output 21 of the digital controller 16. An output 22 of the modulator 19 is coupled to the heater 11. For example, the output 22 of the modulator 19 is connected to the first terminal 12 of the heater 11. The output 22 of the modulator 19 may be directly and permanently connected to the first terminal 12 of the heater 11. The digital sigma-delta-modulator 19 can also be named digital delta-sigma modulator.

Furthermore, the device 10 comprises a system clock 23. An output of the system clock 23 is coupled to a clock input 24 of the digital controller 16. A further output of the system clock 23 is coupled to a clock input 25 of the readout circuit 14.

The readout circuit 14 is realized as a resistance meter. The readout circuit 14 comprises an analog-to-digital converter 30, abbreviated as AD converter. The AD converter 30 has an output connected to the first output 18 of the readout circuit 14. Moreover, the readout circuit 14 comprises a sample-and-hold circuit 31 having an output connected to an input of the AD converter 30. The readout circuit 14 comprises an analog front-end circuit 32 coupled on its input side to the input 15 of the readout circuit 14. An input of the analog front-end circuit 32 is directly and permanently connected to the first terminal 12 of the heater 11. An output of the analog front-end 32 is coupled to the AD converter 30 via the sample-and-hold circuit 31. The readout circuit 14 comprises a second output 26 coupled to a second input 27 of the modulator 19. The readout circuit 14 is realized as a resistance meter for the measurement of the resistance of the heater 11.

The device 10 comprises a module 40. The module 40 comprises the heater 11. The module 40 may be implemented as gas sensor module. The module 40 may comprise a sensor element 41. The sensor element 41 may be, for example, realized as a sensitive resistor.

The readout circuit 14 generates a readout signal SR at the first output 18 of the readout circuit 14. The readout signal SR is provided to the first input 17 of the digital controller 16. The digital controller 16 receives a target signal ST at the second input 28. The digital controller 16 generates a control signal SC at the output 21 of the digital controller 16. The control signal SC is provided to the first input 20 of the modulator 19. The control signal SC is a function of the target signal ST and of the readout signal SR. The control signal SC is generated using a PI or PID algorithm. For example, the control signal SC may be a function of the difference between the target signal ST and the readout signal SR.

The modulator 19 generates a modulator output signal SM at the output 22 of the modulator 19. The modulator output signal SM is applied to the heater 11. The modulator output signal SM is realized as a current or a voltage. The readout signal SR is generated by the readout circuit 14 as a function of a parameter of the heater 11. The readout signal SR may be a function of a resistance value of the heater 11. Since the resistance value 11 of the heater 11 depends on the temperature of the heater 11, the readout signal SR depends on the temperature of the heater 11. Thus, the readout signal SR can be realized as a temperature measurement signal. A closed loop comprises the heater 11, the readout circuit 14, the digital controller 16 and the modulator 19. By using this loop, the resistance value of the heater 11 can be set as a function of the target signal ST.

The modulator 19 receives a pause signal SP at the second input 27 of the modulator 19. The modulator 19 generates the modulator output signal SM with a constant value (e.g. 0 V or 0 A) when the pause signal SP has a first value.

Moreover, the modulator 19 generates the modulator output signal SM as a function of the control signal SC, when the pause signal SP has a second value. The modulator output signal SM may have the form of a bitstream. The modulator output signal SM may obtain only two voltage values, namely a voltage value of 0 V and a first voltage value, or only two current values, such as a current value of 0 A or a first current value I1. The first voltage value may be, for example, equal to a value of a supply voltage VDD. The first current value I1 may be approximately equal to VDD/RHeater, wherein RHeater is the resistance value of the heater 11.

The system clock 23 generates a clock signal SO1 that is applied to the clock input 25 of the readout circuit 14. Moreover, the system clock 23 generates a further clock signal SO2 that is provided to the clock input 24 of the digital controller 16. The first and the second clock signal SO1, SO2 may be equal.

Advantageously, the device 10 performs a precise control of the temperature of the heater 11.

In an alternative embodiment, not shown, the module 40 is free from the sensor element 41. The heater 11 may be realized as an infrared radiation emitter, shorted IR emitter.

Figure 1B:
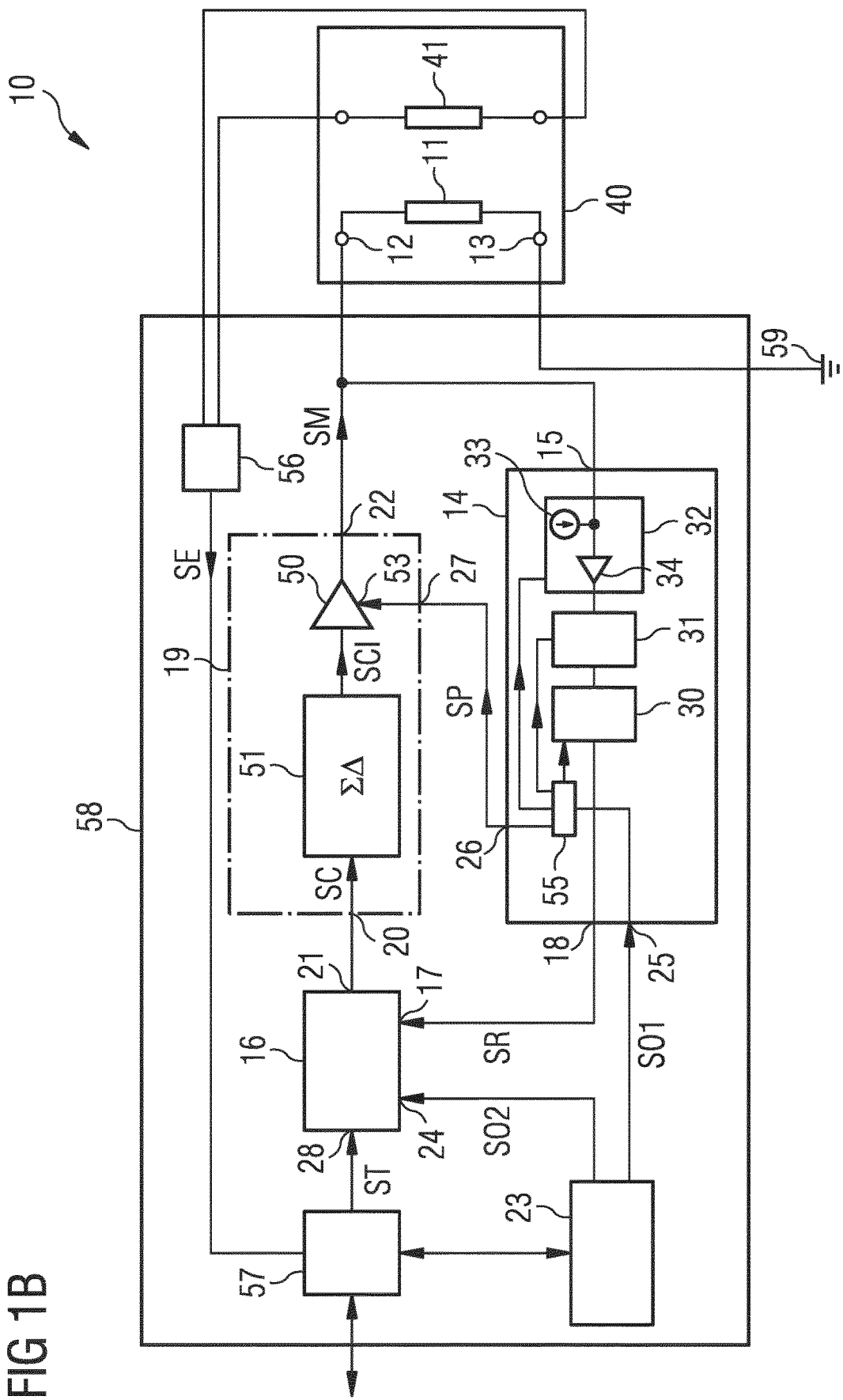

FIG. 1B shows a further example of the device 10 which is a further development of the device shown in FIG. 1A. The modulator 19 comprises a power buffer 50. The power buffer 50 forms an output of the sigma-delta modulator 19. An output of the power buffer 50 is connected to the output 22 of the modulator 19. The output of the power buffer 50 may be directly and permanently connected to the first terminal 12 of the heater 11. The second terminal 13 of the heater 11 is connected to a reference potential terminal 59. The circuits of the device 10, such as the readout circuit 14, the digital controller 16 and the modulator 19, may also be connected to the reference potential terminal 59 by not shown connections.

Moreover, the modulator 19 comprises a sigma-delta modulator circuit 51 that is connected on its input side to the first input 20 of the modulator 19. An output of the sigma-delta modulator circuit 51 is connected to an input of the power buffer 50. The second input 27 of the modulator 19 is connected to a control input 53 of the power buffer 50. Thus, the second output 26 of the readout circuit 14 is connected to the control input 53 of the power buffer 50.

The sigma-delta modulator circuit 51 generates a circuit signal SCI as a function of the control signal SC. The circuit signal SCI is provided to the input of the power buffer 50. The circuit signal SCI is generated independently from a value of the pause signal SP. The power buffer 50 provides the modulator output signal SM. In the case that the pause signal SP has the first value, the power buffer 50 generates the modulator output signal SM with a constant value. The constant value may be, for example, 0 V or 0 A. When the pause signal SP has the first value, the modulator output signal SM is independent from the circuit signal SCI. Only in the case that the pause signal SP has the second value, the power buffer 50 generates the modulator output signal SM as a function of the circuit signal SCI.

The readout circuit 14 comprises a logic circuit 55 that is connected on its input side to the clock input 25 of the readout circuit 14 and on its output side to the second output 26 of the readout circuit 14. Moreover, the logic circuit 55 may be connected to at least one of the AD converter 30, the sample-and-hold circuit 31 and the analog front-end circuit 32. The logic circuit 55 generates the pause signal SP. The analog front-end circuit 32 is implemented such that it is able to measure the resistance value of the heater 11. The first terminal 12 of the heater 11 is connected to the input of the analog front-end circuit 32. For example, the analog front-end circuit 32 may comprise a current source 33 having an output coupled to the input of the analog front-end circuit 32. The output of the current source 33 may be connected to the first terminal 12 of the heater 11. The analog front-end circuit 32 may comprise an amplifier 34 having an input coupled to the input of the analog front-end circuit 32. An output of the amplifier 34 is coupled to the output of the analog front-end circuit 32.

The analog front-end circuit 32 is configured to provide a current to the heater 11 and to measure a voltage value at the first terminal 12 of the heater 11. The voltage or a signal derived from the voltage is provided via the sample-and-hold circuit 31 to the AD converter 30. The current source 33 applies the current to the heater 11. The current flows from the current source 33 via the heater 11 to the reference potential terminal 59. The voltage at the first terminal 12 is amplified by the amplifier 34. The amplified voltage generated by the amplifier 34 is applied via the sample-and-hold circuit 31 to the AD converter 30.

Alternatively, the analog front-end circuit 32 is configured to provide a voltage and to measure the current flowing to the heater 11. The current or a signal derived from the current is provided via the sample-and-hold circuit 31 to the AD converter 30.

The analog front-end circuit 32 operates, when the pause signal SP has the first value, and does not operate, when the pause signal SP has the second value. The current source 33 provides the current to the heater 11, when the pause signal SP has the first value. Optionally, the current source 33 may be switched off and may provide no current, when the pause signal SP has the second value. The current source 33 may be controlled e.g. by the pause signal SP. In an example, the current source 33 and the power buffer 50 do not operate simultaneously. A value of the current provided by the current source 33 may be lower than a value of the current provided by the modulator 19.

The sensor element 41 is connected to a sensor evaluation circuit 56 of the device 10. Moreover, the device 10 comprises a control circuit 57 connected on its output side to the second input 28 of the digital controller 16. The sensor evaluation circuit 56 is coupled to the control circuit 57. The control circuit 57 may be realized as a microprocessor, a microcontroller or a state machine.

The control circuit 57 generates the target signal ST. Thus, the control circuit 57 sets the resistance value and therefore also the temperature of the heater 11. The control circuit 57 has an interface to provide data to other circuits outside of the device 10 and to receive data from other circuits outside of the device 10. The sensor evaluation circuit 56 generates a sensor signal SE as a function of a parameter of the sensor element 41. The sensor signal SE is provided to the control circuit 57.

The device 10 may comprise an integrated circuit 58. The readout circuit 14, the digital controller 16 and the modulator 19 are integrated on a first surface of the integrated circuit 58. At least one of the sensor evaluation circuit 56, the system clock 23 and the control circuit 57 may optionally also be integrated on the first surface of the integrated circuit 58.

Thus, the device 10 is realized using at least two semiconductor bodies: one semiconductor body comprises the integrated circuit 58 and another semiconductor body comprises the module 40. The device 10 may be realized using exactly two semiconductor bodies. Thus, the module 40 may be named off-chip module.

Advantageously, a closed loop control can be achieved using the readout circuit 14 for temperature determination, the heater 11 and the digital controller 16. The loop can work with analog or digital values or a combination of both. A digital or semi-digital implementation has the advantage that the loop can be tuned flexibly even at run time and even when the environmental constraints change greatly; the digital controller 16 may take the form of PI or PID type. The power consumption is reduced, as all elements do not work continuously.

Regarding the heating method, it is possible to have either a linear or pulsed drive. A pulsed drive takes advantage of the long thermal inertia of the heater 11 plus sensor 41, so that the required power is achieved as the average of the pulses applied to the heater 11. The efficiency is very high since in every pulse the power supply is directly applied to the heater 11, save for a low drop due to a MOS switch (which may be part of the power buffer 50).

The heater 11 itself can also be used as the temperature sensor. However, when using a pulsed drive mode, the temperature measurement may be only done when the heater 11 is not biased. This is possible by using the pause signal SP for interrupting the flow of high current I through the heater 11.

The power buffer 50 included in the sigma-delta modulator 19 translates the logic level of the bitstream into an electrical level which may be different than the power supply of the digital cells. The level of the modulator output signal SM provided by the power buffer 50 is usually the supply voltage VDD in order to keep it simple. The components such as the power buffer 50 are sized to handle a current I=VDD/RHeater, wherein RHeater is the resistance value of the heater 11. The power buffer 50 is disabled (put in high impedance mode) by the pause signal SP, whenever a resistance measurement is performed. Conversely, the resistance measurement circuitry 14 is in high impedance when it is not measuring: The input 15 of the readout circuit 14 is in a high impedance state, when the pause signal SP has the second value. Advantageously, disturbances are reduced.

In an alternative embodiment, not shown, the device 10 comprises a temperature sensor connected to the readout circuit 14. The feedback for the control loop is based on measuring temperature of the heater 11 using the temperature sensor or more than one temperature sensors near the heater 11. This results in extra bond pads needed, and additionally can cause extra thermal power loss in the heater 11.

Figure 2A:
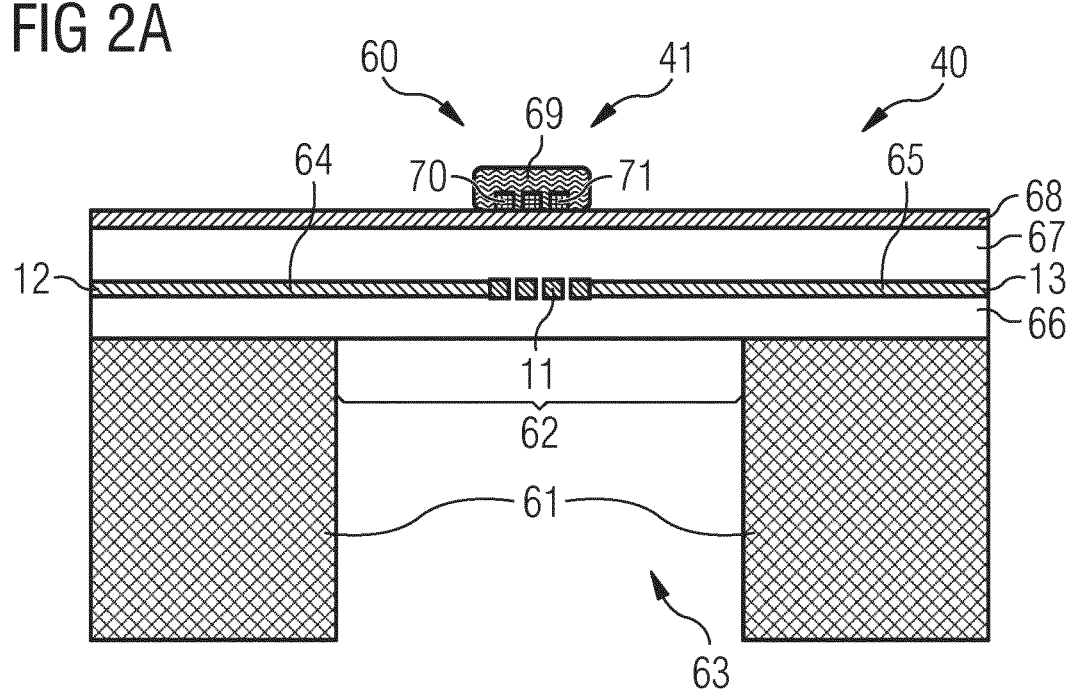
FIG. 2A to 2C show examples of a module of an electro-thermal based device.

FIG. 2A shows an example of the module 40 which is a further development of the modules shown in FIGS. 1A and 1B. The module 40 is fabricated as a gas sensor module. In FIG. 2A, a cross-section of the module 40 is shown. The module 40 comprises a hotplate structure 60 that may be fabricated as a micro hotplate structure. The module 40 comprises a substrate 61 and a membrane 62 that is supported on the substrate 61. The substrate 61 may be a silicon body or a silicon-on-insulator body. The membrane 62 may be realized as a dielectric membrane. The membrane 62 comprises the heater 11. The heater 11 may have a zigzag form or a meander form, or a ring or spiral form. The zigzag form, the meander form, the ring form or the spiral form of the heater 11 can be seen in a view from one side of the module 40 such as, for example, in a top view or in a bottom view. The heater 11 can be circular or rectangular. The material of the heater 11 may comprise a material such as aluminum, copper, titanium, molybdenum, tungsten, titanium nitride, nickel, platinum, gold, polysilicon or single crystal silicon. The heater 11 may be realized as a CMOS interconnect metal and the membrane 62 may be realized using CMOS dielectric layers. Thus, the module 40 may be fabricated by a complementary-metal-oxide-semiconductor technology, abbreviated as CMOS technology.

The module 40 comprises a cavity 63. The membrane 62 spans over the cavity 63. The heater 11 is located adjacent to the cavity 63. The cavity 63 in the substrate 61 may be formed using an etching technique for bulk etching of the substrate 61. The etching technique may be deep reactive ion etching (DRIE) or anisotropic or crystallographic wet etching, for example using an etchant such as potassium hydroxide, KOH, or tetramethylammonium hydroxide, TMAH. Thus, the module 40 is fabricated as a MEMS device.

Figure 5A:
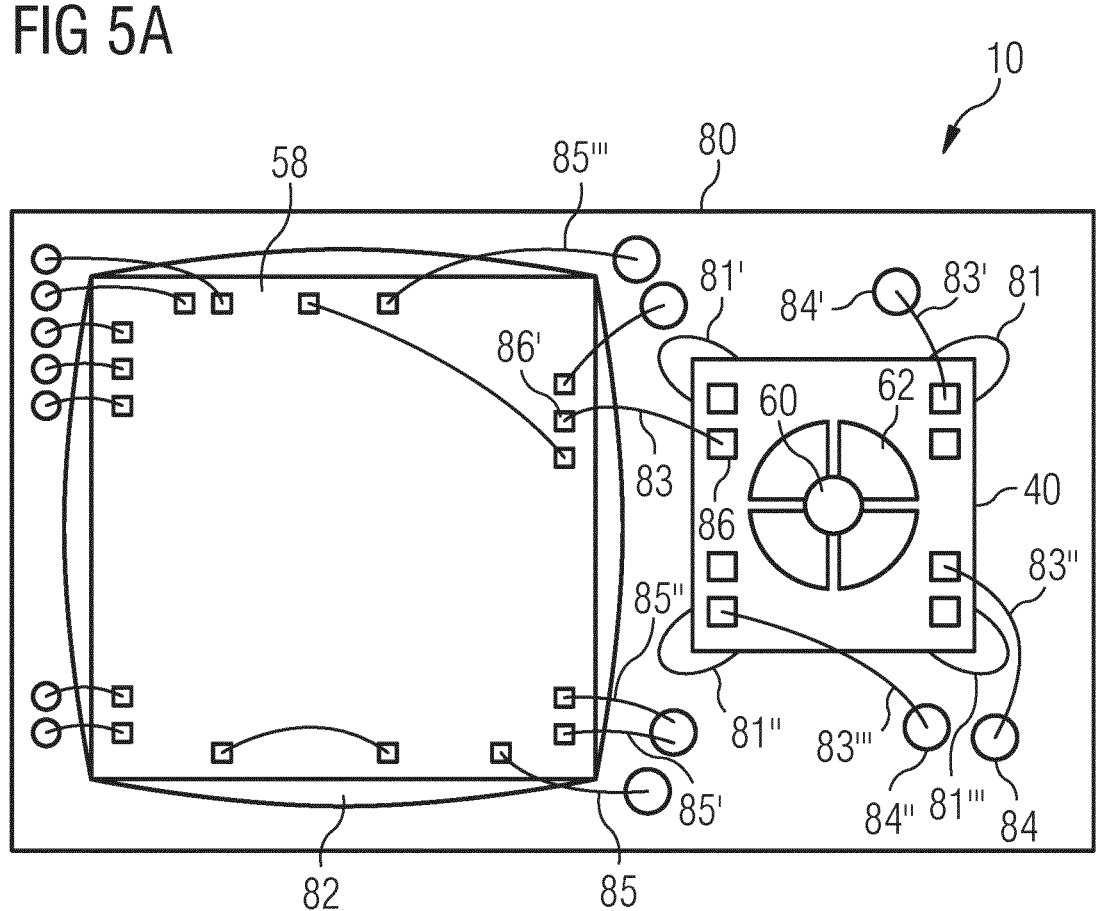
FIG. 5A to 5D show further examples of an electro-thermal based device.
Figure 5B:
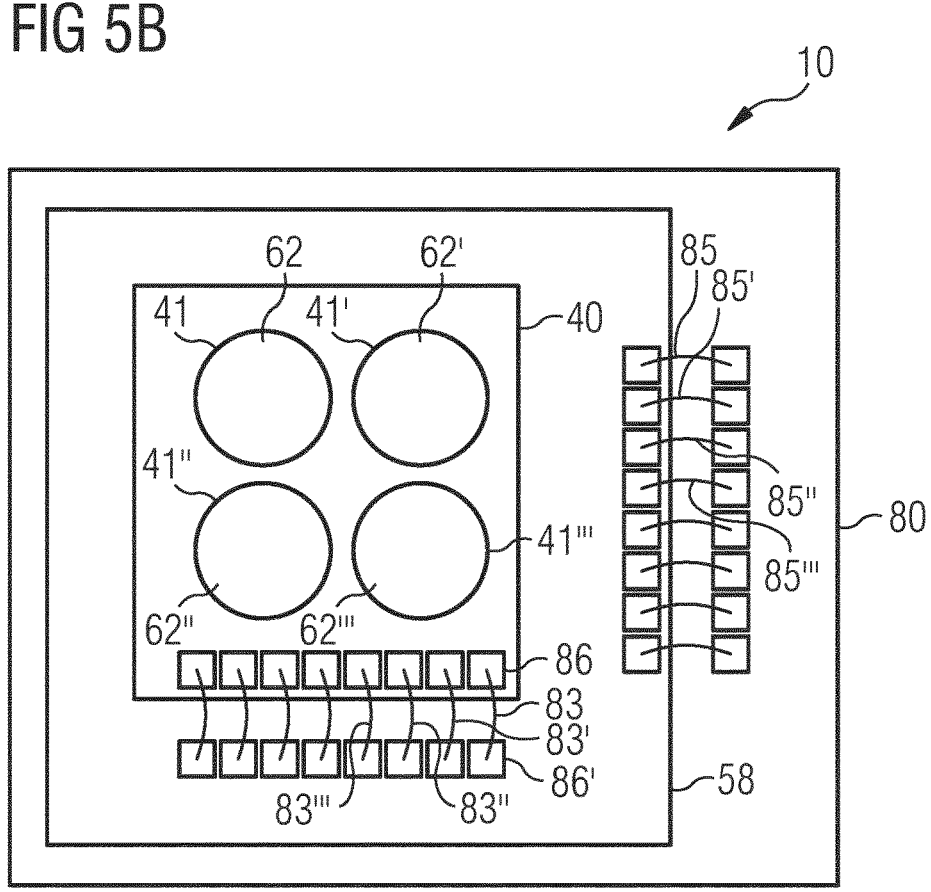
Figure 5B:
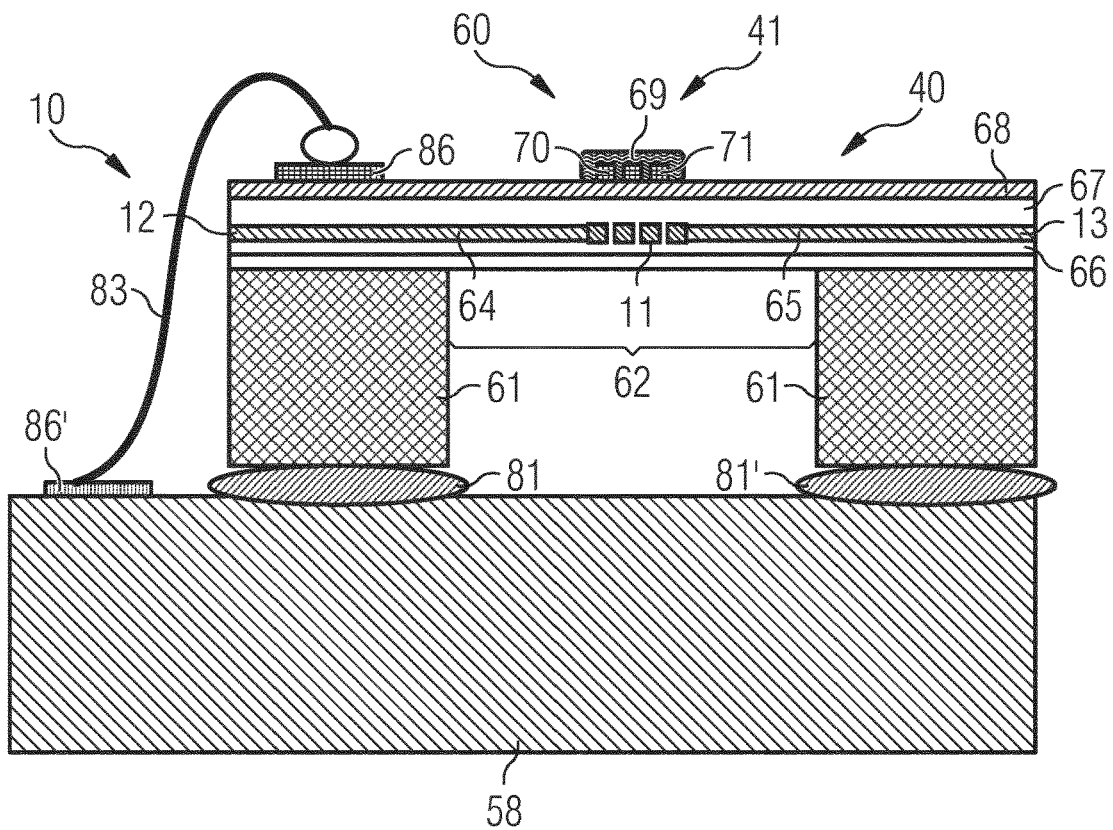

The membrane 62 comprises a first and a second dielectric layer 66, 67. The first dielectric layer 66 is arranged on the substrate 61. The second dielectric layer 67 is arranged on the first dielectric layer 66. The heater 11 is located between the first and the second dielectric layer 66, 67. The membrane 62 may comprise a passivation layer 68 that is arranged on the second dielectric layer 67. The heater 11 may be connected by connection lines 64, 65 to the first and the second terminal 12, 13. The connection lines 64, 65 may be named heater tracks or metallization lines. The first and the second terminal 12, 13 of the heater 11 may be connected by wire bonding to bond pads of the integrated circuit 58, e.g. as shown in FIGS. 5A and 5B. The first and second terminal 12, 13 may be realized as bond pads or bonding areas (not shown). Openings (not shown) in the passivation layer 68 and in the second dielectric layer 67 may allow to contact the connection lines 64, 65 to two bond pads. The first and the second dielectric layer and the passivation layer 66 to 68 may include silicon dioxide, silicon nitride, silicon carbide, tantalum pentoxide or other dielectric layers or a combination of dielectric layers.

The module 40 comprises a sensing material 69 that is arranged on the membrane 62, e.g. on the passivation layer 68. The sensing material 69 may also be named sensitive material or gas-sensitive material. The sensing material 69 interacts with the gas to be measured by the module 40. The module 40 comprises sensing electrodes 70, 71. The sensing electrodes 70, 71 may be realized as interdigitated electrodes. The sensing electrodes 70, 71 may be platinum or gold. The sensing electrodes 70, 71 may comprise an additional adhesion or anti-diffusion layer. Thus, the sensing electrodes 70, 71 form an interdigitated capacitor. The sensing material 69 is arranged on the sensing electrodes 70, 71. The sensing material 69 covers the sensing electrodes 70, 71. The sensing electrodes 70, 71 are realized to measure an impedance value such as a resistance value or a dielectric constant of the sensing material 69. The sensing material 69 may comprise a metal oxide material selected from a group comprising tin oxide, tungsten oxide, zinc oxide, chromium oxide, chromium titanium oxide, gallium oxide, indium oxide, molybdenum oxide or a combination of said metal oxides. The metal oxides may be mixed with other catalysts or dopants such as platinum or palladium. The sensing material 69 can also be a polymer, or a nanomaterial such as silicon nanowires, carbon nanotubes, graphene, or metal oxide nanowires such as zinc oxide nanowires. A resistance value of such a metal oxide changes its value as a function of a concentration of a gas such as a reducing gas (for example $CO$, $H_2$, $H_2S$, $C_xH_y$ and $C_xH_yOH$) or an oxidizing gas (for example $O_2$ and $NO_x$).

The sensing electrodes 70, 71 are connected by not shown connection lines to a first and a second terminal of the sensor element 41. The sensor evaluation circuit 56 is configured to measure the resistance value of the sensing material 69 using the sensing electrodes 70, 71. Thus, the module 40 is realized as resistive gas sensor or chemiresistor. The module 40 is implemented as metal oxide gas sensor that can also be named metal oxide semiconductor gas sensor.

The sensing material 69 may be heated to a high temperature, e.g. in the range of 200-500° C. The high temperature improves the sensitivity to the target gas, improves the response time (higher temperature means faster reaction time), and also lowers the material resistance (which can be in the range of G Ω at room temperature, and so difficult to measure). The temperature set can be affected by various effects, such as ambient temperature changes, air flow across the sensor surface, or due to device variations such as the membrane size and thickness. Since the temperature affects the sensing material resistance, it is important to keep it constant. Otherwise, it is not known if the change in resistance is due to the temperature change or the concentration change of gas. Furthermore, if the temperature changes too much, then the sensitivity is affected, and the sensor may not be sensitive to the target gas anymore. Advantageously, the loop comprising the modulator 19, the heater 11, the readout circuit 14 and the digital controller 16 allows a precise regulation of the temperature of the heater 11 and of the sensor element 41.

The device 10 realizes a gas sensing device employing a heated sensor or heated sensors. In order to be sensitive to gases, they have to be heated to high temperatures (200-500° C.) by using the so-called hotplate 60, which is separate from the integrated circuit 58. The integrated circuit 58 may be fabricated as an application-specific integrated circuit, shorted ASIC. The general structure of the device 10 is visible in FIGS. 1A, 1B, 5A and 5B, and the structure of the hotplate 60 is shown in FIG. 2A.

In an alternative embodiment, not shown, the module 40 is realized as a calorimetric gas sensor. Such a calorimetric gas sensor can also be named catalytic gas sensor or pellistor. In this case, the sensing electrodes 70, 71 are omitted. The heater 11 raises a temperature of the sensing material 69. Thus, a gas that has to be detected is burned at the sensing material 69. The sensing material 69 may be a catalytic material or catalyst such as palladium or platinum. The catalytic material may be fixed in or on a carrier such as aluminum oxide ceramic. The sensing material 69 has the function to increase the burn rate of the gas at the hot surface of the hotplate structure 60. The calorimetric gas sensor is sensitive e.g. for burnable gases.

In this case the sensing material 69 catalyzes the combustion of the target gas if present, which increases the temperature of the membrane 62. The temperature of the heater 11 is a function of the electric power provided to the heater 11 and of the power generated by burning of gas at the sensing material 69. In a constant temperature mode, the temperature of the heater 11 is kept constant by adjusting electric power that is provided to the heater 11. The electric power decreases with increasing concentration of the burnable gas. The electric power provided to the heater 11 has the maximum value at zero concentration of the burnable gas. The sensor evaluation circuit 56 may measure the electric power provided to the heater 11, e.g. by counting the pulses of the modulator output signal SM or the circuit signal SCI during a predetermined measurement time. The sensor evaluation circuit 56 may be connected to the output 22 of the modulator 19.

Alternatively, the sensor signal SE is equal or proportional to the control signal SC. The power provided to the heater 11 is proportional to the sigma-delta control signal SC and the supply voltage of the output buffer 50.

In an alternative embodiment, not shown, the module 40 comprises a further sensor element. The further sensor element may comprise a sensing material different from the sensing material 69 of the sensor element 41. Thus, the device 10 realizes an array of gas sensors. The heater 11 or a further heater may heat the further sensor element. For example, the further sensor element may be sensitive for humidity and the sensor element 41 may be sensitive for another gas. This may e.g. allow to correct a humidity cross sensitivity of the sensor element 41.

Alternately, the further sensor element and the sensor element 41 may both be sensitive to a gas—each being sensitivity to a different gas. As another example both sensor elements 41 may be sensitive to a range of gases, but with different sensitivities to each gas. Furthermore, the array of sensors may comprise any number of sensors and is not limited to two. The array of gas sensors may all be on a single chip (as shown in FIG. 5B), or be on different chips. The array may be all be on a single membrane with a common heater or a separate heater. Alternately, the array may have each gas sensor element 41 on a separate membrane (as elucidated in FIG. 5B). The array may also comprise separate types of sensors, such as a resistive gas sensor, a calorimetric gas sensor and a thermal conductivity gas sensor, and/or any combinations of these, with zero, one or more for each type.

Figure 2B:
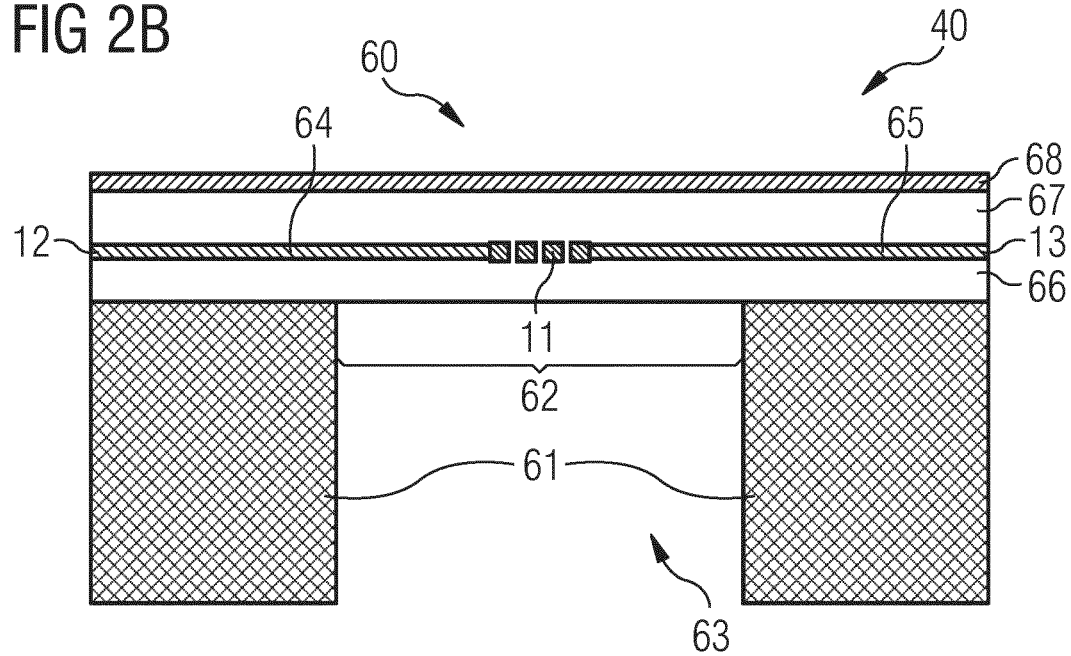

FIG. 2B shows an example of the module 40 which is a further development of the modules shown FIGS. 1A, 1B and 2A. The module 40 is free from the sensor element 41. The module 40 is free of the sensing material 69 and the sensing electrodes 70, 71. Thus the device 10 is realized as an infrared emitter. The module 40 operates as an IR emitter.

The module 40 may additionally have a layer or layers to improve the emissivity and/or spectrum profile of the heater 11. The additional layer or layers can be on or below the membrane 62. The additional layer or layers may comprise or consist of a high emissivity material, for example a metal black such as gold black or platinum black, a porous metal, a high emissivity polymer, carbon black, carbon nanotubes or graphene, or a combination of these. Alternatively, the additional layer or layers may comprise or consist of a plasmonic layer above or below the membrane 62 or embedded within the membrane 62. The plasmonic layer comprises a metal or a dielectric material patterned in a periodic patter, such as a periodic hexagonal pattern of dots or holes.

Advantageously, the stability of the heater 11 is increased by the encapsulation between the first and the second dielectric layer 66, 67. The IR emitter can also be in an array. Thus, the module 40 comprises more than one heater 11. The more than one heater 11 are arranged in an array form.

Alternatively, the device 10 (as shown in FIG. 2B) is realized as a thermal conductivity sensor. The module 40 operates as a thermal conductivity sensor. The electrical energy provided to the heater 11 is partially converted into IR radiation (as described above) and is partially converted into heat. The heat partially flows through the membrane 62 to the substrate 61 and partially flows through the gas below and above the membrane 62. Thus, the heat conducted away from the heater 11 is a function of the thermal conductivity of the gas above and below the membrane 62. In case the temperature of the heater 11 is kept constant by the device 10, the thermal conductivity of the gas above and below the membrane 62 can be measured by measuring the power provided to the heater 11. The power is equal or proportional e.g. to the control signal SC. At a constant temperature of the heater 11, the IR emission and the heat conduction through the membrane 62 are constant. Thus, a change of the thermal conductivity of the gas above and below the membrane 62 results in a change of the control signal SC and can be determined. The thermal conductivity is a measure of a concentration of a gas, e.g. in binary gas mixtures.

Figure 2C:
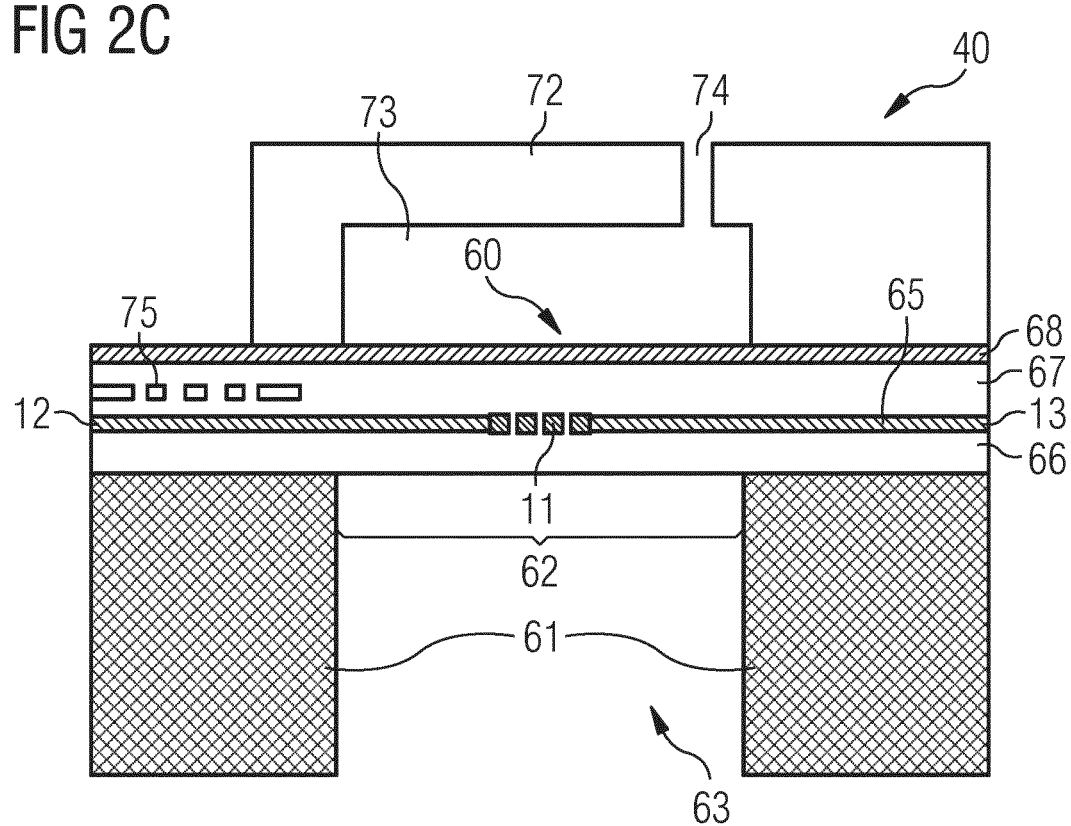

FIG. 2C shows an example of the module 40 which is a further development of the module shown in FIG. 2B. The module 40 operates as a thermal conductivity sensor. The module 40 comprises a heat sink 72. A top cavity 73 is between the heat sink 72 and the membrane 62. The heat sink 72 comprises at least one opening 74 to allow a gas exchange between the top cavity 73 and the area outside of the module 40. The measurement of the thermal conductivity of the gas in the top cavity 73 can be performed as described above. The heat sink 72 may be realized from a material with high thermal conductivity such as silicon or a metal. Thus, the heat sink 72 has approximately the same temperature such as the substrate 61. Advantageously, an influence of gas movement on the measurement is reduced.

Optionally, the module 40 comprises a temperature sensor 75 that measures the temperature of the substrate 61. Thus, the temperature sensor 75 measures the temperature of the heat sink 72. The thermal conductivity of the gas in the top cavity 73 may be calculated from a value of the power provided to the heater 11, a value of the temperature of the heater 11 (that may be predetermined) and a measured value of the temperature of the temperature sensor 75.

Figure 3A:
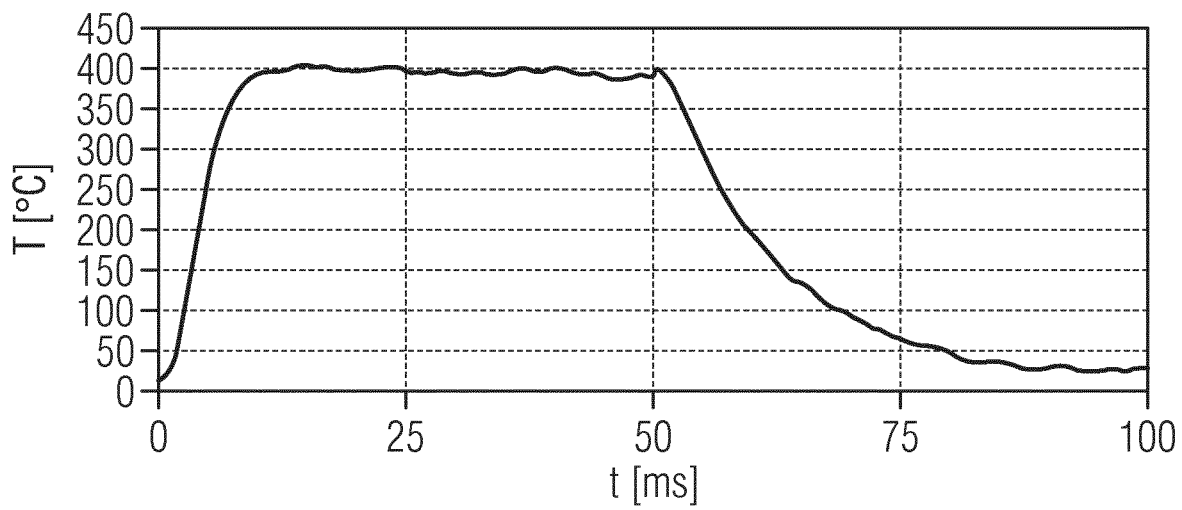
FIGS. 3A and 3B show examples of characteristics of an electro-thermal based device.

FIG. 3A shows an example of a temperature characteristic of the device 10 that may be realized as one of the devices shown above. The heater 11 may have a temperature profile as shown in FIG. 3A. The temperature of the heater 11 starts at a first value, for example at room temperature, and rises up to a second value such as 400° C. and is kept constant for a measurement time such as e.g. 40 milliseconds. After that the temperature falls to the first value. Thus, the heater 11 is driven in a pulsed mode. The gas sensor measurement is performed during the measurement time. Since the heating is only performed during a short time, the average electrical power for heating the module 40 is reduced.

The device 10 solves the problem of keeping the temperature of a heated sensor constant by a closed loop control, while minimizing the thermal transient and the power consumption. The heater 11 can be driven in continuous mode (where it is on all the time) or in pulsed mode (where it is on for only a short period of time, typically between 20 ms to 10 s, and off for a longer period of time). Pulsed mode is particularly useful in portable applications as this reduces the power consumption of the device 10. Having a fast transient time allows the on time during pulse mode to be shorter, which allows either lower power consumption (by having a lower duty cycle) or more frequent pulses (meaning higher measurement frequency). An example of a temperature profile in the hotplate 60 is shown in FIG. 3A.

Figure 3B:
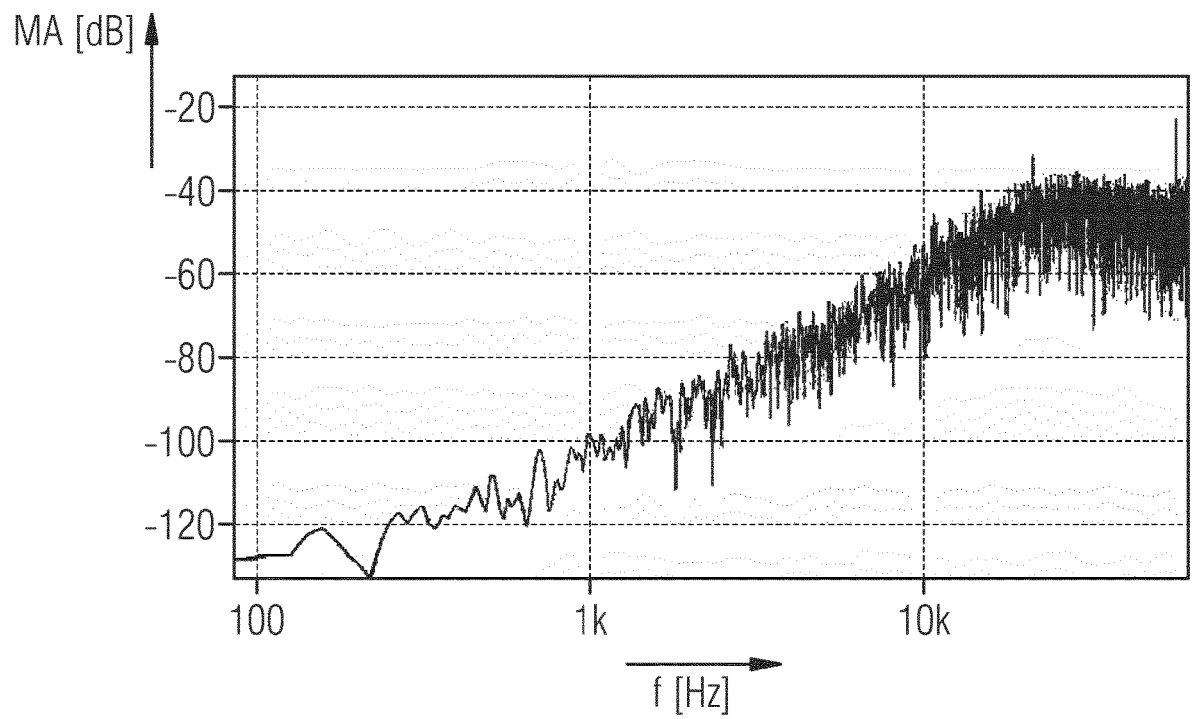

FIG. 3B shows an example of a characteristic of the modulator 19 of the device 10 that may be realized such as shown in one of the figures shown above. In FIG. 3B, the spectrum of the modulator output signal SM is shown. A magnitude MA of the modulator output signal SM is illustrated as a function of a frequency f. According to the example in FIG. 3B, the magnitude MA is less than −40 dB for nearly each of the frequency values. The magnitude MA is especially very low in a frequency range that comprises audible frequencies such as, for example, up to 10 kHz. Advantageously, the sigma-delta modulator 19 does not have a defined period, and the power level is related to the pulse density. The emission spectrum is continuous, as shown in FIG. 3B; another advantage is that the resolution is much higher even using a low system clock.

The device 10 comprises a particular closed loop architecture that keeps a constant temperature on the heater 11 by using a digital control loop and a sigma-delta driver 19. This power efficient solution allows to have a very high resolution even with a moderate clock frequency and to avoid electrical emissions concentrated in a particular frequency. In addition, compared to a PWM modulation generated in the digital domain, the sigma-delta reduces the temperature ripple. The heater 11 itself is used as thermal sensor. The measurement of the temperature is done by turning off the driver 50 for a short time (much shorter than the thermal time of the heater 11), and then measuring the resistance of the heater 11. The driver 50 is then turned on, and the control loop accounts for the time that the heater bias was turned off. The temperature is then calculated from the heater resistance.

Figure 4A:
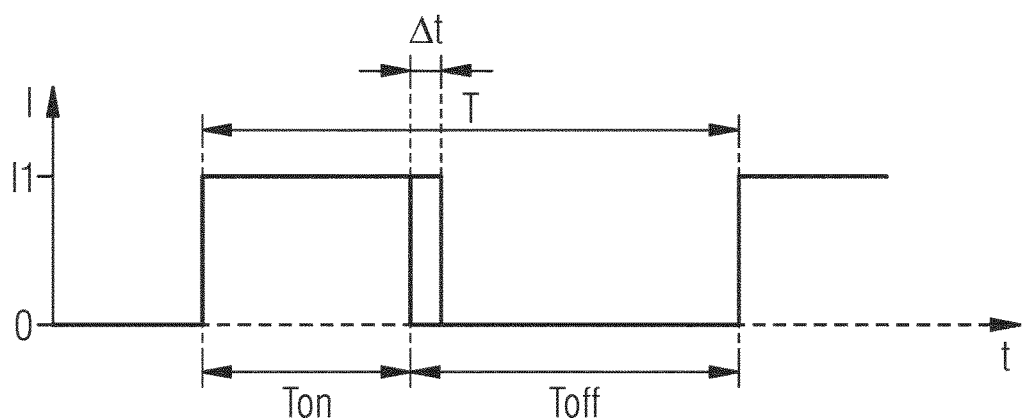

FIG. 4A shows a typical signal of a heater supply using pulse width modulation. The current I flowing through the heater 11 is repeated after a period T. The period T has a predetermined constant value. During a switch-on time Ton inside the period T the current I has a first value I1. During a switch-off time Toff inside the period T, the current I has the value 0 A. To increase an average current provided to the heater 11, the switch-on time Ton is, for example, increased by a difference time ΔT. Such a current I could be provided to the heater 11 in the case that the modulator 19 shown in FIGS. 1A and 1B is realized as a pulse width modulator instead of a sigma-delta modulator.

FIG. 4B shows an example of a spectrum for a modulator signal SM that is realized as a pulse width modulated signal. The current I having the form of a pulse width modulated signal, as shown in FIG. 4A, results in a high magnitude MA even at low frequency values. Thus, the high values in the spectrum may possibly result in audible disturbances of other parts of an apparatus comprising the device 10.

Two strategies for generating the pulses can be used: PWM or sigma-delta. PWM use a periodic waveform, as shown in FIG. 4A in which the pulse width is directly proportional to the required power. The main disadvantage is that the emission spectrum is concentrated in lines at multiples of the PWM frequency; for example if 10 kHz is used, it will affect audio frequency devices, such as the microphone in a phone. The spectrum of a PWM signal is shown in FIG. 4B. The PWM waveform also causes ripples in the temperature of the hotplate 60, which can cause noise in the measurement of the sensing material resistance; to mitigate this effect a very high frequency is used. In addition, the resolution of a digital implementation is related to the minimum variation of the ON phase, which drives the requirement on the system clock; a high clock would be required in order to reach a good resolution, but this would also mean a higher emission level.

FIG. 5A shows an example of the device 10 that is a further development of the examples shown in the figures above. The device 10 comprises a carrier 80. The module 40 is arranged on the carrier 80. For example, the device 10 comprises a glue 81 that fixes the module 40 to the carrier 80. As shown in FIG. 5A, the glue 81 may be implemented using four dots 81, 81', 81", 81'". The four dots 81, 81', 81", 81'" of the glue are arranged at the four corners of the module 40. As shown in FIG. 5A, in a top view, the cavity 63 has the form of a circle. Several bonding wires 83 connect the module 40 either to the carrier 80 or to the integrated circuit 58, for example to conducting lines 84, 84', 84" on the carrier 80.

Moreover, the device 10 comprises the integrated circuit 58. The integrated circuit 58 and the module 40 are realized as separate semiconductor bodies. The integrated circuit 58 is attached by a further glue 82 to the carrier 80. The further glue is shown at all four sides of the integrated circuit 58. The integrated circuit 58 is also connected by bonding wires 85 to the carrier 80, for example to conducting lines on the carrier 80. The carrier 80 may be realized as a printed circuit board, abbreviated PCB, ceramic carrier such as a thin film or thick film ceramic substrate or a socket such as a TO socket. A not shown housing may encapsulate the carrier 80 together with the integrated circuit 58 and the module 40. The housing has an opening to allow a contact of the gas to be measured to the sensing material 69.

The physical connection between the integrated circuit 58 and the heater 11 (and all the other components on the off-chip module 40) is done via direct bonding wires or bonding wires to a package substrate 80, as shown in FIG. 5A. The heater 11 may increase a temperature of the substrate 61 of the module 40. By the use of two semiconductor bodies, advantageously, an influence of the module 40 on the integrated circuit 58 is reduced. The module 40 and the integrated circuit 58 can be produced with different fabrication technologies.

In an alternative embodiment, not shown, the integrated circuit 58 and the module 40 are realized on a single semiconductor body.

FIG. 5B shows an example of the device 10 that is a further development of the examples shown in the figures above. The upper part of FIG. 5B shows a top view and the lower part of FIG. 5B shows a cross section of the device 10. The module 40 is attached at the integrated circuit 58, e.g. by the glue 81, 81'. The module 40 is located on the integrated circuit 58. The integrated circuit 58 is between the module 40 and the carrier 80. Thus, the module 40 is not directly fixed on the carrier 80. The carrier 80 may be realized as package substrate. A bond pad 86 of the module 40 is connected to the connection line 64 of the module 40. At least one bond wire 83, 83', 83", 83'" connects bond pads 86 of the module 40 to bond pads 86' of the integrated circuit 58. The integrated circuit 58 may be fabricated as application specific integrated circuit, shorted ASIC.

The module 40 is realized as a gas sensor array. Thus, the module 40 comprises an array of sensor elements 41, 41', 41", 41'". The number of sensor elements 41, 41', 41", 41'" may be e.g. two, three, four or more than four. The sensor elements 41, 41', 41", 41'" may be located in a regular manner. For example, the number is four and the four sensor elements 41, 41', 41", 41'" are located on the four edges of a rectangle or a square. The sensor elements 41, 41', 41", 41'" may comprise different sensing materials 69 and/or are heated to different temperatures. Each of the sensor elements 41, 41', 41", 41'" comprises a hotplate structure 60 with a membrane 62, 62', 62", 62'".

Advantageously, the gas sensor chip 40 can be above the ASIC die 58, glued together by a die attach 81, 81'. There are bond pads 86, 86' on the gas sensor chip 40 and the ASIC chip 58 which can be connected by a wire bond 83.

Figure 5C:
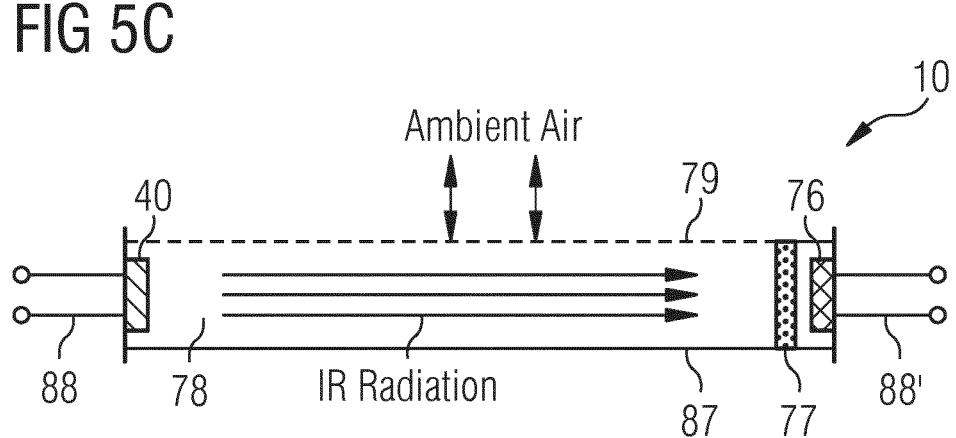

FIG. 5C shows an example of the device 10 which is a further development of the devices shown above. The device 10 is realized as a gas sensor that is implemented as an optical gas sensor. The device 10 is configured as an IR sensor, especially as a nondispersive infrared sensor, shorted NDIR sensor. The module 40 operates as IR emitter. The heater 11 is implemented as an IR radiation emitter.

The device 10 comprises the module 40 operating as IR emitter, a detector 76, an optical filter 77 and an optical path 78. A perforated path 79 provides a sample to be analyzed to the optical path 78. The device 10 further comprises electrical connections 88, 88' to the module 40 and to the detector 76. The detector 76 is realized as an optical detector such as an IR detector. A chamber 87 of the device 10 may contain the gas sample inside the optical path 78. The chamber 87 may be realized as a tube.

The perforated path or path openings 79 allow the ambient air on environment to diffuse into the chamber 87 and into the optical path 78. The heater 11 emits IR radiation, which passes through the optical filter 77 and reaches the detector 76. The optical filter 77 is such that it allows only a narrow band wavelength of IR radiation to reach the detector 76. This narrow band at least partially overlaps with the absorption wavelength of the target gas.

When the concentration of the target gas increases, more of the IR radiation inside the wavelength band of the optical filter 77 is absorbed by the gas and the IR radiation reaching the detector 76 decreases, giving a lower output signal at the detector 76. The change in signal of the detector 76 can be used to determine the concentration of the target gas.

The module 40 is configured as IR emitter. Thus, the heater 11 is designed as an IR radiation emitter. The IR emission is performed by a MEMS based IR emitter based on a micro-hotplate. Alternative implementations of an IR emitter can be a micro-bulb, or an infrared emitting diode. In case of a MEMS based or diode based IR emitter, it may be attached directly to a PCB or packaged in a TO can type package, or an SMD package. A window or filter can also be integrated into the package.

The detector 76 for detecting IR radiation can be a thermopile, pyrodetector, bolometer or a photodiode. It may be packaged as a TO-package or as an SMD, and may or may not have the optical filter 77 integrated within the package. The optical path 78 is shown as a tube here, but it should be obvious that many variations are possible, for example using reflections of the IR emission from the walls of the chamber 87 and can be a circular path, or a single reflection, or relying on multiple reflections.

The inlet 79 for the ambient air could be connected to the optical path 78 in any number of ways. It could be as shown in FIG. 5C by having several holes in the tube, but could be a single large or small inlet, and may have a particle filter for protection.

Figure 5D:
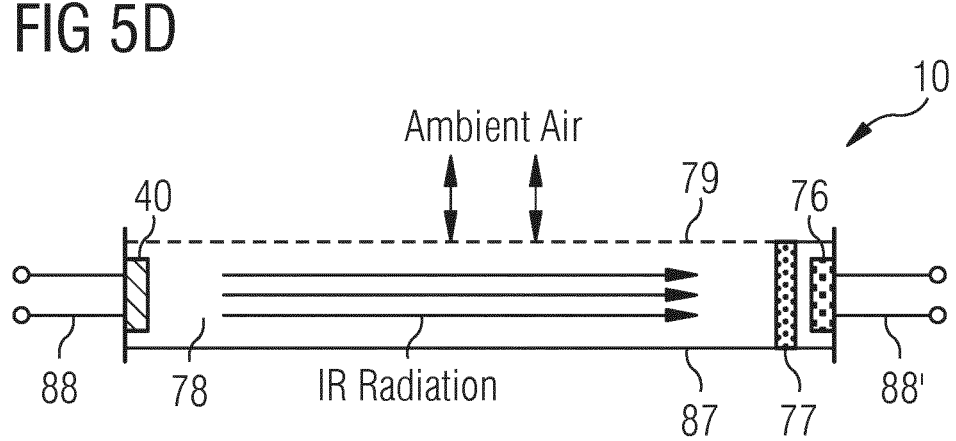

FIG. 5D shows an example of the device 10 which is a further development of the devices shown above. The device 10 is realized as a gas sensor that is implemented as an optical gas sensor. The device 10 is configured as photoacoustic sensor. The module 40 operates as IR emitter. The heater 11 is implemented as an IR radiation emitter.

The device 10 realizing a photoacoustic sensor comprises the module 40 for realizing an IR emitter, the detector 76 implemented as a microphone, the optical filter 77 and the optical path 78. The device 10 may comprise a perforated path 79 to the optical path 78. The optical path 78 may be located in a chamber 87 of the device 10. Moreover, electrical connections 88, 88' are connected to the module 40 and the detector 76. The microphone 76 is not necessarily in line of sight of the IR emitter 11.

The perforated path 79 or path openings allow the ambient air on environment to diffuse into the optical path 78 or chamber 87. The module 40 emits infrared radiation, which passes through the optical filter 77 and heats the air surrounding the detector 76 realized as a microphone. This causes the air to expand and change the pressure which is detected by the microphone 76. The optical filter 77 is implemented such that it allows only a narrow band wavelength of IR radiation to reach the microphone package. This narrow band at least partially overlaps with the absorption wavelength of the target gas. When the concentration of the target gas increases, more of the IR radiation in the wavelength band of the optical filter 77 is absorbed by the gas in the optical path 78 and the IR radiation reaching the detector 76 (that is the microphone package) decreases, resulting in a lower pressure change, giving a lower output signal at the microphone. The change in signal of the detector 76 realized by the microphone can be used to determine the concentration of the target gas. The module 40 implementing the IR emitter may be operated in pulsed mode. The module 40 is fabricated as MEMS based IR emitter realized by a micro-hotplate.

Alternatively, the IR emitter can be a micro-bulb, or an IR emitting diode. In case of a MEMS based or diode based IR emitter, it may be attached directly to a PCB or packaged in a TO can type package, or an SMD package. A window or filter can also be integrated into the package.

The microphone 76 may be packaged with the optical filter 77, and the package may or may not be completely air tight. The optical path 78 is shown as a tube here, but it should be obvious that many variations are possible, for example using reflections of the IR emission from the walls of the chamber 87 or the optical path 78 and can be a circular path, or a single reflection, or relying on multiple reflections. The inlet 79 for the ambient air could be connected to the optical path 78 in any number of ways. It could be as shown in FIG. 5D by having several holes in the tube, but could be a single large or small inlet, and may have a particle filter for protection. This is given an as example, but many variations of the photoacoustic sensor are possible.

Figure 6A:
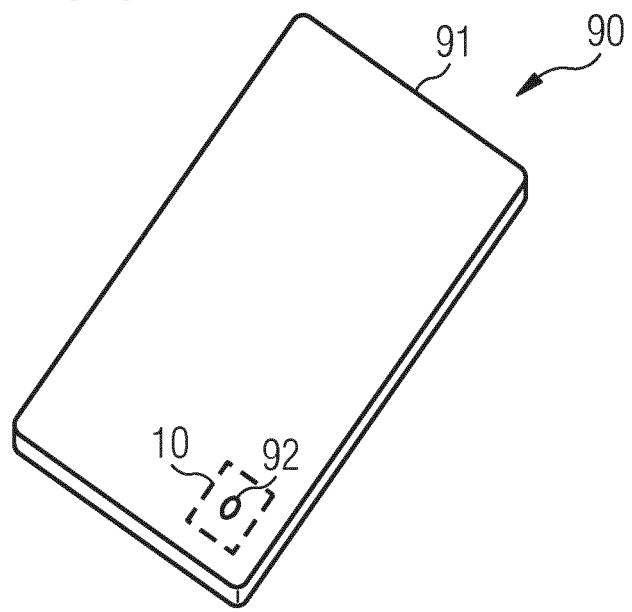
FIGS. 6A and 6B show examples of an apparatus with an electro-thermal based device.

FIG. 6A shows an example of an apparatus 90 with an electro-thermal based device 10 that is realized as shown above. The apparatus 90 is realized as a mobile device 91. The device 10 is incorporated inside the mobile device 91. A cover of the mobile device 91 has an opening 92 for entry of air to the device 10. The mobile device 91 may be a device for mobile communication, a smart device, a smart speaker or a home automation device.

Figure 6B:
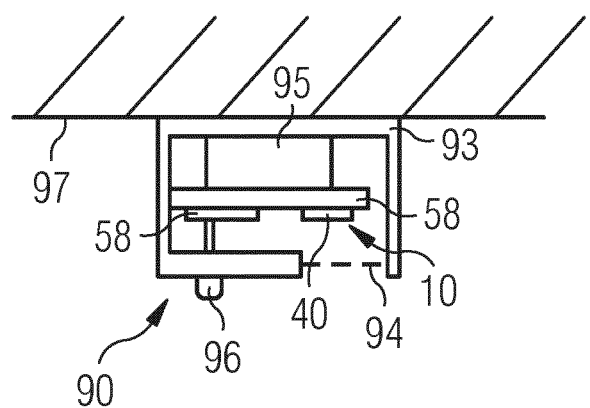

FIG. 6B shows an example of an apparatus 90 with an electro-thermal based device 10 that is realized as shown above. The apparatus 90 is realized as an indoor air monitor. The apparatus 90 has a housing 93 holding the device 10. The housing 93 comprises a sieve 94 to allow penetration of the gas to be detected to the device 10. The apparatus 90 may comprise e.g. a battery 95 connected to the device 10 for power supply. An indicator 96 may be connected to the device 10. The indicator 96 is implemented e.g. as a buzzer and/or a light source that provides an alarm when the device 10 measures a gas concentration above a predetermined threshold. The apparatus 90 may be fixed to a ceiling 97.

Alternatively, the apparatus 90 is realized as an outdoor air monitor, an automotive air monitor and an industrial air or gas monitor. The apparatus 90 may be portable or fixed to a carrier such as the ceiling 97, a wall, a machine etc.

Alternatively, the apparatus 90 may be connected to a mobile device such as a device for mobile communication, a smart device, a smart speaker or a home automation device by a cable or wireless. The apparatus 90 may provide the measurement result to the mobile device and/or receive the electric power from the mobile device.

The electro-thermal based device 10 can also be named electro-thermal device, MEMS device or device.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. An electro-thermal device comprising:
   a heater;
   a readout circuit comprising an analog-to-digital converter;
   a digital controller having a first input coupled to a first output of the readout circuit; and
   a digital sigma-delta modulator having a first input coupled to an output of the digital controller, a second input configured to receive a pause signal and an output coupled to the heater,
   wherein the analog-to-digital converter has an output connected to the first output of the readout circuit,
   wherein the readout circuit comprises a second output coupled to the second input of the digital sigma-delta modulator,
   wherein the readout circuit is configured to generate the pause signal and to determine a readout signal when the pause signal has a first value,
   wherein the digital sigma-delta modulator comprises a sigma-delta modulator circuit that is connected, on its input side, to the first input of the digital sigma-delta modulator,
   wherein the digital sigma-delta modulator comprises a power buffer comprising:
      an input connected to an output of the sigma-delta modulator circuit,
      an output connected to the output of the digital sigma-delta modulator, and
      a control input connected to the second input of the digital sigma-delta modulator, and
   wherein the digital sigma-delta modulator is configured to generate a modulator output signal with a constant value when the pause signal has the first value.

2. The electro-thermal device according to claim 1, wherein the electro-thermal device is a gas sensor or an array of gas sensors.

3. The electro-thermal device according to claim 1, wherein the electro-thermal device is an infrared emitter.

4. The electro-thermal device according to claim 1, wherein the electro-thermal device is a thermal conductivity sensor.

5. The electro-thermal device according to claim 1, wherein the electro-thermal device is a micro-electro-mechanical-system device featuring a membrane, and wherein the heater is embedded.

6. The electro-thermal device according to claim 1,
   wherein the readout circuit is configured to generate the readout signal at the first output of the readout circuit,
   wherein the digital controller comprises a second input configured to receive a target signal, and
   wherein the digital controller is configured to:
      generate a control signal as a function of the readout signal and of the target signal, and
      provide the control signal to the first input of the digital sigma-delta modulator.

7. The electro-thermal device according to claim 1,
   wherein the heater is electrically coupled to the readout circuit, and
   wherein the readout circuit is configured to generate the readout signal as a function of a resistance value of the heater.

8. The electro-thermal device according to claim 1, wherein the digital controller is a proportional-integral-derivative (PID) digital controller or a proportional-integral (PI) digital controller.

9. An apparatus comprising:
   the electro-thermal device according to claim 1,
   wherein the apparatus is a mobile device, an indoor air monitor, an outdoor air monitor, an automotive air monitor, or an industrial air or gas monitor.

10. An electro-thermal device comprising:
    a heater implemented as an IR radiation emitter;
    a readout circuit;
    a digital controller having a first input coupled to a first output of the readout circuit; and
    a digital sigma-delta modulator having a first input coupled to an output of the digital controller, a second input configured to receive a pause signal, and an output coupled to the heater,
    wherein the digital sigma-delta modulator comprises a sigma-delta modulator circuit that is connected, on its input side, to the first input of the digital sigma-delta modulator,
    wherein the digital sigma-delta modulator comprises a power buffer comprising:
       an input connected to an output of the sigma-delta modulator circuit,
       an output connected to the output of the digital sigma-delta modulator, and
       a control input connected to the second input of the digital sigma-delta modulator,
    wherein the digital sigma-delta modulator is configured to generate a modulator output signal with a constant value when the pause signal has a first value,
    wherein the electro-thermal based device is a micro-electro-mechanical-system device and comprises a substrate, a membrane, a cavity, a chamber, and a sensor element,
    wherein the membrane is a dielectric membrane supported on the substrate and spans over the cavity,
    wherein the heater is arranged in, above or below the membrane,
    wherein the sensor element is a microphone or a pressure sensor,
    wherein the chamber encloses a gas sample, the heater and the microphone or the pressure sensor,
    wherein a perforated path or path openings is/are configured to allow ambient air to diffuse into the chamber,
    wherein the electro-thermal device is a photoacoustic gas sensor, and
    wherein the photoacoustic gas sensor is configured to heat a gas in the gas sample, the gas being able to absorb IR radiation and the gas being detectable by the microphone or the pressure sensor.

11. An electro-thermal based device comprising:
    a heater implemented as an IR radiation emitter;
    a readout circuit;
    a digital controller having a first input coupled to a first output of the readout circuit; and
    a digital sigma-delta modulator having a first input coupled to an output of the digital controller, a second input configured to receive a pause signal and an output coupled to the heater,
    wherein the digital sigma-delta modulator is configured to generate a modulator output signal with a constant value when the pause signal has a first value, wherein the readout circuit comprises an analog-to-digital converter having an output connected to the first output of the readout circuit, wherein the readout circuit comprises a second output coupled to the second input of the digital sigma-delta modulator, and wherein the readout circuit is configured to generate the pause signal and to determine a readout signal when the pause signal has the first value, wherein the electro-thermal based device is a micro-electro-mechanical-system device and comprises a substrate, a membrane, a cavity, a chamber, and a sensor element, wherein the membrane, being a dielectric membrane, is supported on the substrate and spans over the cavity, wherein the heater is arranged in, above or below the membrane, wherein the sensor element is a microphone or a pressure sensor, wherein the chamber encloses a gas sample, the heater and the microphone or the pressure sensor, wherein a perforated path or path openings is/are configured to allow an ambient air to diffuse into the chamber, wherein the electro-thermal based device is a photoacoustic gas sensor, and wherein the photoacoustic gas sensor is configured to heat a gas in the gas sample, the gas being able to absorb IR radiation and the gas being detectable by the microphone or the pressure sensor.

* * * * *

UNITED STATES PATENT AND TRADEMARK OFFICE
CERTIFICATE OF CORRECTION

PATENT NO. : 11,762,402 B2
APPLICATION NO. : 17/287865
DATED : September 19, 2023
INVENTOR(S) : Maccioni et al.

Page 1 of 1

It is certified that error appears in the above-identified patent and that said Letters Patent is hereby corrected as shown below:

In the Claims

In Column 20, in Claim 10, Line 36, after "electro-thermal" delete "based".

Signed and Sealed this
Second Day of January, 2024

Katherine Kelly Vidal
Director of the United States Patent and Trademark Office